United States Patent [19]
Goldstein et al.

[15] 3,680,355
[45] Aug. 1, 1972

[54] METHOD AND APPARATUS FOR PERFORMANCE MONITORING OF DUAL PLATFORM INERTIAL NAVIGATION SYSTEMS

[72] Inventors: Murray S. Goldstein, Spring Valley, N.Y.; Harold Lerman, Paramus; Robert Acker, Packanack Lakes; Herbert S. Ross, Emerson, all of N.J.

[73] Assignee: The Singer Company, New York, N.Y.

[22] Filed: Oct. 7, 1970

[21] Appl. No.: 78,773

[52] U.S. Cl. ................................. 73/1 E, 33/226 Z
[51] Int. Cl. ............................................. G01c 17/38
[58] Field of Search .... 73/178 R, 1 E, 1 D; 33/226 Z; 74/5.34

[56] References Cited

UNITED STATES PATENTS 3,398,586   8/1968   Griffin et al. ................. 33/226 Z

*Primary Examiner*—Donald O. Woodiel
*Attorney*—S. A. Giarratana and Thomas W. Kennedy

[57] ABSTRACT

The performance of a dual platform inertial navigation system of the type wherein each platform is stabilized by two, two degree-of-freedom gyros is monitored by utilizing the redundant axis gyro output of each platform to produce an attitude error indication of the GO/NO GO operating condition of the platform about the redundant axis of the platform. The redundant gyro axes of the two platforms are aligned with two, mutually-perpendicular inertial reference axes and the rate output of each redundant axis gyro is sensed, compared with a computed rate output for the corresponding navigation gyro axis, and integrated to provide an attitude error indication for each platform about the redundant axis for that platform. Signals from the roll and pitch synchros of each platform are compared and the difference signals resolved into two attitude error signals representing the attitude error about each of the two inertial reference axes, so that the two redundant axis error signals may be logically compared with the two attitude error signals derived from the synchros to provide a GO/NO GO fault warning signal for each platform.

8 Claims, 5 Drawing Figures

PLATFORM 1    PLATFORM 2

INVENTORS.
MURRAY S. GOLDSTEIN
HAROLD LERMAN
ROBERT ACKER
HERBERT S. ROSS

BY
S. A. Giauratane
Thomas W. Kennedy
ATTORNEY

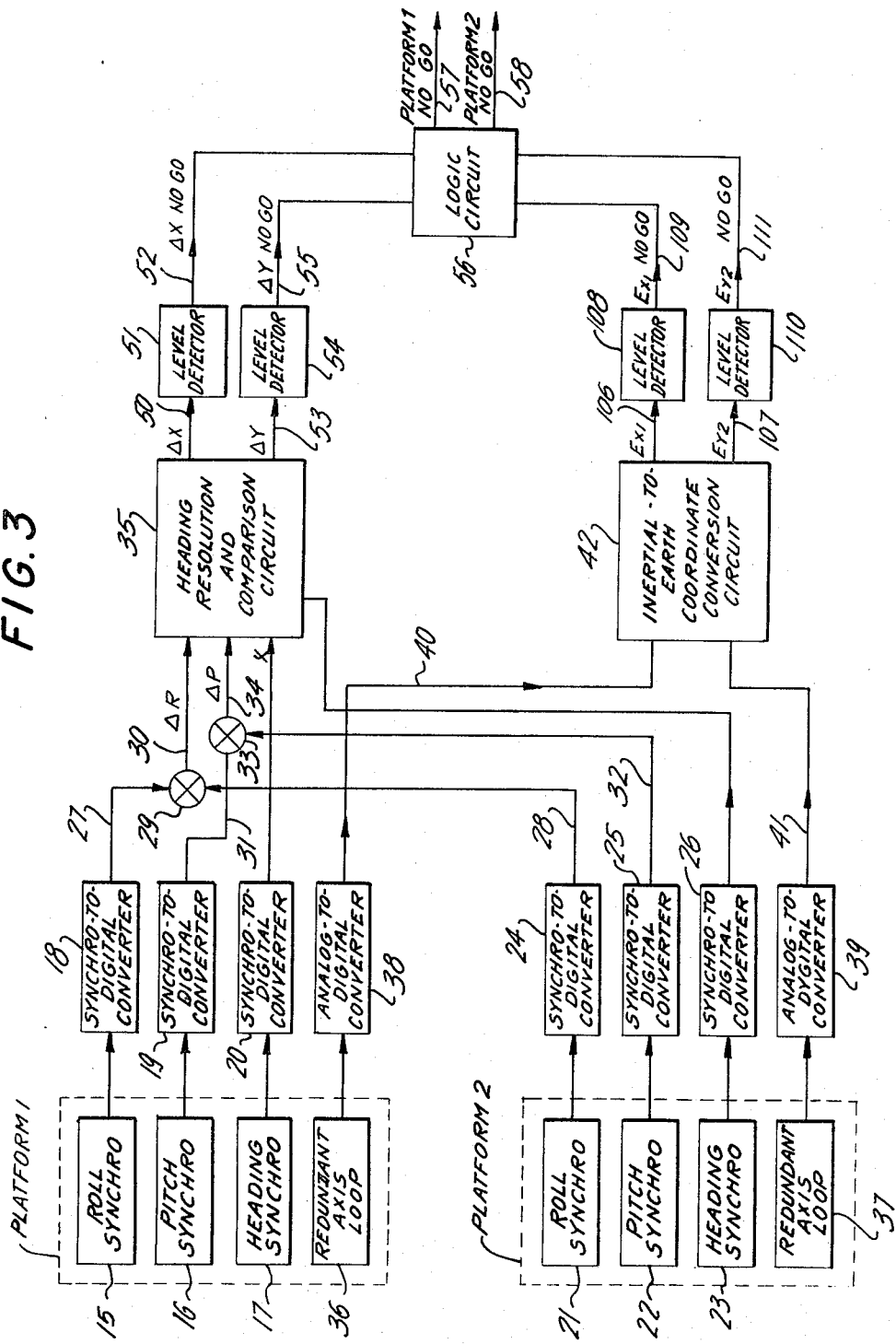

METHOD AND APPARATUS FOR PERFORMANCE MONITORING OF DUAL PLATFORM INERTIAL NAVIGATION SYSTEMS

BACKGROUND OF THE INVENTION

1. Field of the Invention

This invention relates generally to performance monitoring systems for space vehicle navigation and guidance systems and the like and more particularly to a novel method and apparatus for the performance monitoring of dual platform inertial navigation and control systems.

2. Description of the Prior Art

Built-in test equipment and other equipment for the detection of faults in aircraft and other space vehicle navigation and control systems and the like has assumed increasing importance with the development of so-called "inertial" navigation systems. In systems of this type, a platform or instrument "cluster" is made stable in inertial space by the use of gyroscopes to provide an unchanging system of inertial reference axes aircraft which air or other vehicle attitude can be measured. Since the heart of such systems is the inertial measuring unit or stable platform, it is of vital importance that the output signals from this unit be reliable at all times. In order to achieve this degree of reliability, many systems, and particularly those for aircraft navigation and guidance, rely upon two separate inertial systems each utilizing a separate inertial platform, so that if one platform should fail the other platform is available to provide the required inertial guidance signals. For such a two-system configuration, however, it becomes extremely important to determine which of the two inertial platforms is providing correct navigation signals to the aircraft or other vehicle in the event that the signals produced by one platform do not correspond to the signals produced by the other platform. To this end, many prior art performance monitoring arrangements rely upon the monitoring of power supply voltages, nulls or other circuit outputs to provide some indication of correct system performance. In these types of fault detection systems, the criteria for correct system performance is usually obtained by extrapolating system data to provide a standard of proper performance. Accordingly, prior art systems of this type do not provide data which is directly indicative of system performance but instead rely upon an artificially-determined standard of system performance. While it is possible to provide a greater assurance of system reliability by the use of more than two separate inertial measuring units, it is apparent that the increased cost of such systems may well render them prohibitively expensive for applications, such as commercial aircraft navigation systems, for example, where cost of equipment becomes an important factor in the design and use of such equipment.

SUMMARY OF THE INVENTION

It is an object of this invention to provide built-in test and fault monitoring capabilities for the dual platform type of inertial navigation systems by providing the benefits obtained from the use of a third independent inertial platform without incurring the cost and weight penalties dictated by the actual addition of such a third separate inertial measuring unit.

It is a further object of this invention to provide a performance monitoring arrangement for the dual platform type of inertial navigation system, wherein a "voting" procedure is employed to determine which two out-of-three system outputs are correct and to identify the correctly performing system.

It is still a further object of this invention to provide a performance monitoring arrangement for the dual platform type of inertial navigation system, wherein such performance monitoring arrangement relies upon measured system data rather than extrapolated data to perform its monitoring function.

It is an additional object of this invention to provide a performance monitoring method for the dual platform type of inertial navigation system which requires only minor modifications to be made to the inertial platforms of such type of system to carry out the required performance monitoring function.

Briefly, the performance monitoring function of the invention is carried out by utilizing the redundant axis gyro output which is available from inertial platforms of the type wherein platform stability is defined by two, two-degree-of-freedom gyros. In a dual platform inertial navigation system, the redundant gyro axes of the platforms are aligned along a pair of mutually-perpendicular inertial reference axes, so that the pair of redundant axes are perpendicular to each other. A first pair of platform attitude error signals are derived from the platform pickoff devices, such as the roll and pitch synchros, for example, by sensing the output signals from the pickoff devices and resolving them into components representing the difference in attitude of the platforms about each of the pair of inertial reference axes along which the redundant gyro axes are aligned. Each of the redundant axis gyros is rate captured to produce attitude rate signals for platform movements about the redundant axis associated with that gyro. The attitude rate signals so produced by each gyro are compared with a computed rate signal representing the attitude rate of the corresponding non-redundant axis gyro output, to thereby produce a rate difference signal which is then integrated to produce a platform attitude error signal representing the attitude error of the platform about the particular redundant axis associated with that platform. When the inertial navigation system is employed for aircraft navigation, wherein earth-fixed coordinates are employed, the rate difference signals may be modified by earth rate, velocity and gyro drift signals prior to integrating the rate signals, so that the attitude error signals so produced are transformed to the earth coordinate system. By virtue of the foregoing arrangement, two pairs of platform attitude error signals are produced and may be compared by known logic techniques to obtain fault warning output signals which represent the operating condition of each inertial platform, so that an incorrectly operating platform can be readily identified.

The nature of the invention and other objects and additional advantages thereof will be more readily understood by those skilled in the art after consideration of the following detailed description taken in conjunction with the accompanying drawings.

BRIEF DESCRIPTION OF THE DRAWINGS

In the drawings:

FIG. 3 is a schematic diagram of a performance monitoring system constructed in accordance with the teachings of the present invention;

DESCRIPTION OF THE PREFERRED EMBODIMENT OF THE INVENTION

Figure 1:
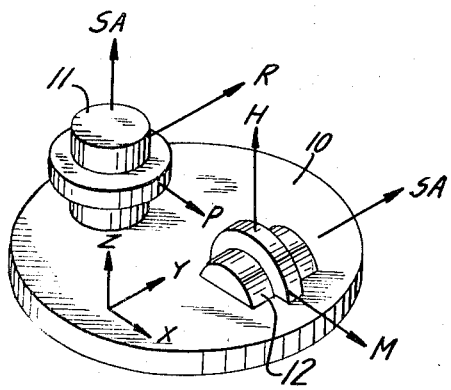
FIG. 1 is a perspective view of an inertial platform with the associated gimbals and other equipment removed to show the orientation of the two, two degree-of-freedom gyros located thereon.

Referring now to FIG. 1 of the drawings, there is shown an inertial platform 10 which may form the inertial measuring unit of an inertial navigation system. For convenience of illustration, the platform gimbals, pickoffs and torque motors have been eliminated and a three-axis coordinate system, consisting of mutually-perpendicular X, Y and Z axes shown. As illustrated, the plane of the stable platform 10 is defined by the X and Y reference axes while the Z axis is shown as being perpendicular thereto. The platform 10 has mounted upon it a gyroscope 11 and a gyroscope 12 which serve to define and maintain the platform in the inertial orientation defined by the three reference axes. Each of the gyroscopes 11 and 12 is a two degree-of-freedom gyroscope, wherein the gyroscope casing is free to move with respect to the spin axis SA of the gyroscope about two mutually-perpendicular "input" axes which are also perpendicular to the spin axis. The detailed construction and operation of a typical two degree-of-freedom gyroscope is shown and described, for example, in U. S. Pat. No. 3,077,785, granted Feb. 19, 1963, and will not be further described herein. As seen in FIG. 1 of the drawings, the gyroscope 11 is so oriented on the platform 10 that the spin axis SA of the gyro is aligned with the Z reference axis and is therefore perpendicular to the plane of the platform. Accordingly, the gyro 11 is capable of sensing movements of the vehicle in which the platform is mounted about two the gyro input axes. Consequently, the gyro 11 is shown as having an input axis R which is capable of sensing the roll, for example, of a vehicle in which the platform is mounted. Similarly, the second input axis P of the gyro is capable of sensing the pitch of the vehicle in which the platform is mounted. The gyro 12 is so mounted on the platform 10 that its spin axis SA lies in the plane of the platform and therefore also lies in the X-Y reference plane. An input axis H of this gyro is perpendicular to the plane of the platform and is aligned with the Z preference axis, so that the gyro 12 is capable of sensing the azimuth or heading of a vehicle in which the platform is mounted. Consequently, the gyros 11 and 12 employ three of their four input axes to sense movements of the vehicle about three mutually-perpendicular axes. Roll, pitch and heading synchros (not shown) are mounted on the gimbals to provide signals representing the roll, pitch and heading of the vehicle in which the platform is mounted.

Figure 2:
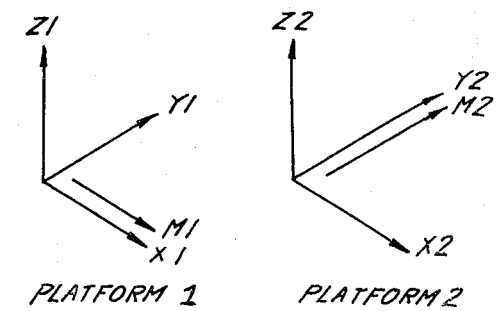
FIG. 2 is a schematic diagram showing the orientation of the redundant gyro axis on each platform of a dual platform type of inertial navigation system.

It will be noted, however, that the second input or M axis of the gyro 12 is not utilized, since the heading information is determined solely by the use of the H input axis. Consequently, the M input axis is not needed for navigation purposes and is a redundant axis for the gyro 12, since it is not actually employed in the production of the useful data. The present invention proposes to make use of the redundant input axis which is available on each inertial platform of a dual platform type of inertial navigation system, to effectively provide attitude data from a third platform without the need of actually utilizing a third inertial measuring unit. As seen in FIG. 2 of the drawings, this may be accomplished by orienting the redundant axis M1 of the azimuth or heading gyro on a platform 1 of a dual platform system along the X1 inertial reference axis of the platform. A platform 2 of the same system is so arranged that the redundant axis M2 of the heading gyro for that platform is aligned with the Y2 inertial reference axis of that platform, so that it is perpendicular to the redundant axis M1 of the heading gyro of the first platform. It is apparent from an inspection of FIG. 1 of the drawings that a rotation of the redundant axis M of the heading gyro to a position along the Y reference axis will in no way affect the heading measurement by the heading gyro, since the H input axis of that gyro is still perpendicular to the plane of the platform. Consequently, the redundant axis of the heading gyro on one of the platforms can sense the attitude error of the platform about the X inertial axis while the redundant axis of the heading gyro on the other inertial platform can sense the attitude error of that platform about the Y inertial axis, so that platform attitude information is available without using the non-redundant axis outputs of the platform gyros.

A schematic diagram of the performance monitoring arrangement of the invention is shown in FIG. 3 of the drawings, wherein it is seen that the output of roll synchro 15 of platform 1, the output of pitch synchro 16 of that platform and the output of heading synchro 17 of the same platform are respectively applied to synchro-to-digital converters 18, 19 and 20 which convert the respective synchro analog signals to corresponding digital signals which are more readily adapted to computer processing. In a similar manner, the outputs of roll synchro 21, pitch synchro 22 and heading synchro 23 of platform 2 are respectively applied to synchro-to-digital converters 24, 25 and 26 to convert the analog output signals from these synchro units to corresponding digital signals in accordance with known techniques. The output from roll synchro 15 of platform 1, which is now in digital form, is applied by a lead 27 and the output from roll synchro 21 of platform 2, which is also in digital form, is applied by a lead 28 to a digital subtraction circuit 29 which functions in a known manner to provide a signal at its output lead 30 which is the difference $\Delta R$ between the output of roll synchro 15 of the first platform and the output of roll synchro 21 of the second platform. In a similar manner, the output from pitch synchro 16 of the first platform is applied by a lead 31 and the output from the pitch synchro 22 of the second platform is applied by a lead 32 to a digital subtraction circuit 33 which produces a signal $\Delta P$ at its output 34 which represents the difference between the pitch synchro outputs of the platforms. The $\Delta R$ and $\Delta P$ signals appearing respectively at leads 30 and 34 are applied to a heading resolution and comparison circuit 35 for reasons which will be explained hereinafter.

Figure 4:
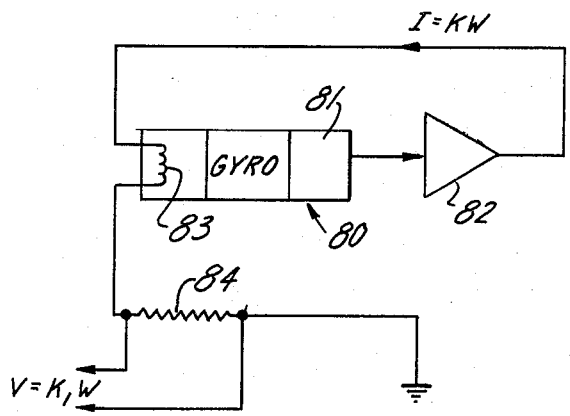
FIG. 4 is a circuit diagram of the redundant axis rate gyro loop which is used to provide a redundant axis rate signal from each inertial platform.

A redundant axis loop circuit 36 is provided to sense the rate of attitude movement of the platform 1 about the redundant axis M1 of the heading gyro for that platform. Similarly, a redundant axis loop circuit 37 is provided to sense the rate of attitude movement of the platform 2 about the redundant axis M2 of the heading gyro on that platform. Since the redundant axis M1 is aligned with the inertial reference axis X1 of platform 1, the loop circuit 36 will sense the rate of platform attitude change about the X1 inertial reference axis of platform 1. In a similar manner, the loop circuit 37 will sense the rate of platform attitude change of platform 2 about the Y2 inertial reference axis of that platform. The circuit employed for each of the two redundant axis loop circuits 36 and 37 is shown in FIG. 4 of the drawings wherein it is seen that a heading gyro 80, which may be the heading gyro of either platform, is provided with a pickoff 81 which is coupled through an amplifier 82 to a torquing coil 83 for the gyro. The torquing coil 83 is coupled through a resistance 84 to ground, so that in accordance with known practice, the gyro is rate captured and the current I produced by the pickoff and applied to the torquing coil is proportional to the inertial rate W applied to the gyro. Accordingly, the voltage V appearing across the resistance 84 is directly proportional to the inertial rate W of gyro about the redundant axis being sensed. Since known types of commercially-available, two degree-of-freedom gyros employed for the inertial platform are usually provided with torquing coils for each of the two input axes of the gyro, it is apparent that only minor circuit modifications are usually required to employ the redundant axis of the gyro as a signal generator. Consequently, each of the inertial measuring units forming a dual platform navigation system may be easily and economically modified to provide the redundant axis rate signals employed in the present invention. The redundant axis rate signal derived from circuit 36 of platform 1 is applied to an analog-to-digital converter 38, so that the analog voltage signal from the gyro loop is converted to a corresponding digital signal for convenience of data processing. In a similar manner, the analog output voltage of the redundant axis loop circuit 37 of platform 2 is applied to an analog-to-digital converter 39 so that the redundant axis rate information for that platform is presented in digital form.

Figure 5:
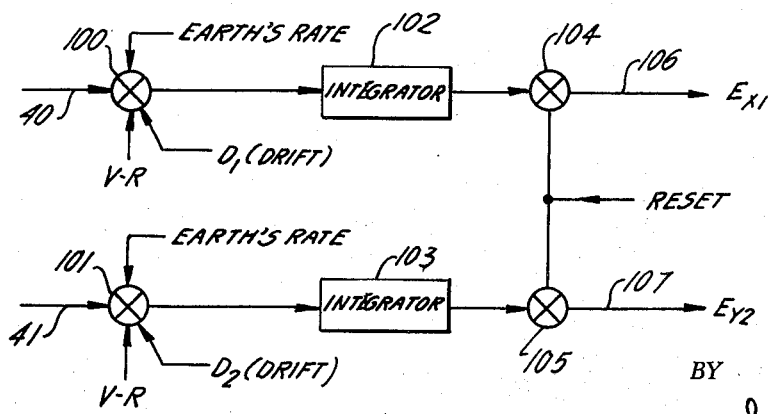
FIG. 5 is a schematic diagram of the inertial-to-earth coordinate conversion circuit shown in FIG. 3 of the drawings.

Since the redundant axis rate signals generated by circuits 36 and 37 are rate signals about two of the inertial reference axes, it becomes necessary to modify these inertial signals by rates which transform the coordinate system from an inertial system to an earth-fixed system, if the inertial navigation system is to be used for aircraft navigation which is normally earth-fixed. To this end, the redundant axis rate signals from the circuits 36 and 37 are respectively applied by by leads 40 and 41 to an inertial-to-earth coordinate conversion circuit 42 which is shown in detail in FIG. 5 of the drawings. As seen in FIG. 5, the redundant axis rate signal from the heading gyro of platform 1 is applied to a digital summing circuit 100 where it is modified by signals representing the earths rate, velocity and gyro drift for platform 1. Similarly, the redundant axis rate signal from the heading gyro of platform 2 is applied by the lead 41 to a second digital summing circuit 101 where it is modified by signals representing the earths rate, velocity and gyro drift for platform 2. By virtue of this arrangement, each of the attitude rate signals derived from the redundant axis gyros is compared with a computed rate signal representing the attitude rate or "torquing" rate of the corresponding non-redundant axis gyro output to produce a rate difference signal representing the difference therebetween.

Since the modified inertial or rate difference signals appearing at the output of summing means 100 and 101 are in rate form, they are respectively applied to integrators 102 and 103 where they are integrated to produce signals representing the attitude or "verticallity" error of the inertial platforms. Additionally, since the rate gyros from which the attitude rate signals are derived are subject to drift which may produce an apparent attitude error, a gyro drift signal correction is applied to each of the summing means 100 and 101. The drift rate may be kept within acceptable limits by periodically resetting each of the integrator outputs by a reset signal as shown schematically at 104 and 105, so that a spurious verticallity failure indication due to redundant gyro drift is not produced at the output of the conversion network 42. By the foregoing arrangement, a signal $E_{X1}$ is produced at output 106 of the conversion network 42 which represents the verticallity or attitude error of platform 1 about the X1 axis of that platform since the X1 axis is aligned with the redundant axis M1 of the heading gyro on that platform. Similarly, an output signal $E_{Y2}$ is produced at output 107 of the conversion network 42 and represents the attitude error of platform 2 about the Y2 axis of that platform since the redundant axis M2 of the heading gyro for that platform is aligned with the Y2 axis. Accordingly, the output signals $E_{X1}$ and $E_{Y2}$ respectively define the verticallity error of the inertial platforms 1 and 2.

Referring again to FIG. 3 of the drawings, it is seen that the $E_{X1}$ signal appearing at output 106 of the conversion network 42 is applied to a level detector 108 which compares the level of the signal with an acceptable verticallity error about the X1 axis of platform 1 and produces an $E_{X1}$ NO GO signal at its output 109. The acceptable limits of the verticallity error about the X1 axis are, of course, determined by the platform configuration and the parameters of the inertial navigation system. In a similar manner, the output signal $E_{Y2}$ appearing at output 107 of conversion network 42 is applied to a level detector 110 where the verticallity error about the Y2 axis of platform 2 is compared to an acceptable error level so that an $E_{Y2}$ NO GO signal is produced at output 111. Accordingly, the $E_{X1}$ NO GO and $E_{Y2}$ NO GO signals appearing at the outputs 109 and 111 provide indications that the platform verticallity error signals are exceeding prescribed limits.

As thus far described, it is believed apparent that four signals $\Delta R$, $\Delta P$, $E_{X1}$ and $E_{Y2}$ are generated by the performance monitoring system of the invention. In order to understand the performance monitoring concept of the invention the operation of the system at a zero heading condition will be described. At zero heading, the roll axis of platform 1 is aligned with the inertial reference axis X1 of that platform and the pitch axis of platform 2 is aligned with the inertial reference axis Y2 of platform 2. Since the roll axis of platform 1 is also aligned with the redundant axis M1 of the heading gyro of platform 1 and the pitch axis of platform 2 is aligned with the redundant axis M2 of the heading gyro of platform 2, it is believed apparent that $\Delta R$ and $\Delta P$ indicate the attitude error or difference between platforms about the X1 and Y2 axes. The $E_{X1}$ and $E_{Y2}$ signals also indicate the attitude error about the X1 and Y2 axes, so that a logical combination of the four signals can identify a platform which has exceeded prescribed attitude error limits. For example, if platform 1 has a failure which produces a rotation about the X1 axis of 30 arc minutes, the platform 1 roll synchro reads 30 minutes while the platform 2 roll synchro reads zero minutes and $\Delta R$ will be 30 minutes. Since the redundant axis M1 of platform 1 is aligned with the X1 axis, the redundant loop of the platform 1 will sense the failure and the output signal appearing at 109 of level detector 108 will indicate an $E_{X1}$ NO GO fault indication which indicates that platform 1 is operating incorrectly and that platform 2 should be utilized. If, however, a rotational failure of platform 2 occurs about the X2 axis of that platform, the platform 1 roll synchro will read 0 minutes and the platform 2 synchro will read 30 minutes so that $\Delta R$ is still 30 minutes. In this case however, the redundant loop of platform 1 indicates that there is no failure of verticallity of that platform so that platform 2 is identified as the faulty platform and the data from platform 1 is accepted. By virtue of the same logic, incorrect synchro readings can be isolated and determined at all cardinal headings.

It may be noted that the foregoing description of the operation of the system is based upon the assumption of a zero heading condition wherein the roll and pitch axes are aligned with the X and Y inertial reference axes. For headings which are not zero, the $\Delta R$ and $\Delta P$ signals must be resolved into components of attitude error about the X and Y inertial reference axes since the $\Delta R$ and $\Delta P$ signals must be compared with the $E_{X1}$ and $E_{Y2}$ signals which represent attitude error about these inertial axes. When this is done, the logic described above can be utilized for all headings. The resolution of the $\Delta R$ and $\Delta P$ signals can be expressed mathematically as follows:

1. $\Delta X = \Delta R \cos \psi - \Delta P \sin \psi$; and

2. $\Delta Y = \Delta R \sin \psi + \Delta P \cos \psi$, where $\Delta X$ is the attitude error about the X inertial axis, $\Delta Y$ is the attitude error about the Y inertial axis, $\Delta R$ is the difference in roll synchro outputs, $\Delta P$ is the difference in pitch synchro outputs, and $\psi$ is the heading.

The foregoing resolution of the $\Delta R$ and $\Delta P$ signals into the $\Delta X$ and $\Delta Y$ inertial axes components may be carried out by the heading resolution and comparison circuit 35 in accordance with known digital computer techniques and for this purpose the circuit 35 is shown in FIG. 3 of the drawings as receiving the heading synchro outputs $\psi$ from the heading synchros of the inertial platforms. The $\Delta X$ signal appears at an output 50 of the resolution circuit 35 and is applied to a level detector 51 which compares the $\Delta X$ attitude error component with an acceptable error level and produces a $\Delta X$ NO GO signal at its output 52 when the acceptable level is exceeded. In a similar fashion, the $\Delta Y$ attitude error component appearing at the output 53 of the resolution circuit is applied to a level detector 54 which produces a $\Delta Y$ NO GO signal at its output 55 when a predetermined level of attitude error about the Y axis is exceeded. The following mathematical analysis demonstrates that the operating condition of both inertial platforms may be determined by reference to the $\Delta X$, $\Delta Y$, $E_{X1}$ and $E_{Y2}$ signals. For the purpose of analysis, it will be assumed that the heading $\psi_1$, of platform 1 is the same as the heading $\psi_2$ of platform 2, so that the heading of the system is $\psi$. The relationship between synchro readings and platform attitude error about the X-Y inertial axes is given by the following expressions:

3. $E_{R1} = E_{X1} \cos \psi + E_{Y1} \sin \psi$;

4. $E_{P1} = -E_{X1} \sin \psi + E_{Y1} \cos \psi$;

5. $E_{R2} = E_{X2} \cos \psi + E_{Y2} \sin \psi$; and

6. $E_{P2} = -E_{X2} \sin \psi + E_{Y2} \cos \psi$, where $E_{X1}$ and $E_{Y1}$ are the respective attitude errors of platform 1 about the inertial axes, $E_{X2}$ and $E_{Y2}$ are the respective attitude errors of platform 2 about the inertial axes X and Y, $E_{R1}$ is the error in roll synchro output of platform 1 caused by $E_{X1}$ and $E_{Y1}$, $E_{P1}$ is the error in pitch synchro output of platform 1 caused by $E_{X1}$ and $E_{Y1}$, and $E_{R2}$ and $E_{P2}$ are the corresponding synchro errors for platform 2 caused by the inertial axes error components of that platform. Accordingly, 7. $\Delta R = (E_{X1} - E_{X2}) \cos \psi + (E_{Y1} - E_{Y2}) \sin \psi$; and 8. $\Delta P = (-E_{XL} + E_{X2}) \sin \psi + (E_{Y1} - E_{Y2}) \cos \psi$.

Substituting the expressions for $\Delta R$ and $\Delta P$ given by equations (7) and (8) into equations (1) and (2) which define $\Delta X$ and $\Delta Y$ yields 9. $\Delta X = (E_{X1} - E_{X2}) \cos^2 \psi + (E_{Y1} - E_{Y2}) \sin \psi \cos \psi + (E_{X1} - EBX2) \sin^2 \psi - (E_{Y1} - E_{Y2}) \cos \psi \sin \psi$;

10. $\Delta X = E_{X1} - E_{X2}$; and similarly

11. $\Delta Y = E_{Y1} - E_{Y2}$.

From these equations the following Truth Table may be constructed:

| $\Delta X$ | $\Delta Y$ | $E_{X1}$ | $E_{Y2}$ | Conclusion |
|---|---|---|---|---|
| NO GO | GO | NO GO | GO | Platform 1 NO GO |
| NO GO | GO | GO | GO | Platform 2 NO GO |
| GO | NO GO | GO | NO GO | Platform 2 NO GO |
| GO | NO GO | GO | GO | Platform 1 NO GO |
| GO | GO | GO | GO | Platform 1 and 2 GO |

From the foregoing mathematical analysis, it is believed apparent that the $\Delta X$, $\Delta Y$, $E_{X1}$ and $E_{Y2}$ signals are all produced by the performance monitoring system of the invention and provide all the information which is needed to logically determine which of the two inertial platforms is performing correctly. These signals are applied to the level detectors 51, 54, 108 and 110 to provide logical NO GO signals which are then applied by the leads 52, 55, 109 and 111 to a logic circuit 56. The logic circuit 56 may be constructed in accordance with known logic techniques to carry out the foregoing Truth Table determinations. Accordingly, a fault indication indicating that platform 1 is in a NO GO condition is produced at the output 57 of the logic circuit and a fault warning indication that platform 2 is in the NO GO condition is produced at the output 58 of the logic circuit.

It is believed apparent from the foregoing description of the preferred embodiment of the invention that known systems for inertial navigation having only two inertial platforms may be employed to provide information which is normally obtained from a third platform to provide a voting technique which determines which of the two platforms is performing correctly. The disclosed performance monitoring arrangement may be carried out by simple modifications of known types of inertial platforms which utilize two, two degree-of-freedom gyros and require only minimal computer processing of the monitoring signals produced. The described arrangement depends solely upon observed or measured system data and does not require the extrapolation techniques utilized in many prior art arrangements. Accordingly, a highly reliable system of performance monitoring is obtained at a cost substantially less than that required for a system utilizing three independent inertial measuring units.

It is believed apparent that many changes could be made in the construction and described uses of the foregoing fault monitoring system and many seemingly different embodiments of the invention could be constructed without departing from the scope thereof. For example, the logic and data resolution techniques employed could be altered in accordance with known procedures to suit the parameters and operating conditions of different inertial systems. Accordingly, it is intended that all matter contained in the above description or shown in the accompanying drawings shall be interpreted as illustrative and not in a limiting sense.

What is claimed is:

1. The method of monitoring the performance of inertial navigation systems of the type having dual inertial platforms, wherein each platform is defined by two, two degree-of-freedom gyros so that one gyro on each platform has a redundant axis, and wherein each platform has a pair of pickoff devices arranged to indicate the respective attitude of said platform, and wherein the redundant axis gyro on each platform has means adapted to provide an output indicating the attitude error of its platform about its redundant axis, comprising the steps of aligning the redundant gyro axes of said platforms along a pair of mutually-perpendicular inertial reference axes, so that said redundant axes are mutually-perpendicular;

deriving a first pair of attitude error signals from the platform pickoff devices to indicate the difference in attitude between platforms about each of said pair of inertial reference axes;

deriving a second pair of attitude error signals from the redundant axis gyro outputs to indicate the attitude error of each platform about the redundant axis associated therewith; and logically comparing said first and second pairs of attitude error signals to obtain fault warning output signals representing the operating condition of each of said platforms.

2. The performance monitoring method claimed in claim 1, wherein said first pair of attitude error signals are derived by sensing the output signals from said platform pickoff devices, and resolving said signals into components representing the difference in attitude between said platforms about each of said pair of inertial reference axes.

3. The performance monitoring method claimed in claim 1, wherein said second pair of attitude error signals are derived by rate capturing the redundant axis gyros to produce attitude rate signals for platform movements about said redundant axes, comparing each of the attitude rate signals with a computed rate signal representing the attitude rate of the corresponding non-redundant axis gyro output to produce a rate difference signal representing the difference therebetween, and integrating each of said rate difference signals to produce said second pair of attitude error signals.

4. The performance monitoring method claimed in claim 3, wherein said computed rate signal is derived from the computed torquing rate of the said non-redundant axis gyro output and includes earth rate velocity and gyro drift components to convert the inertial coordinates to earth fixed coordinates.

5. A performance monitoring arrangement for a dual platform inertial navigation system of the type wherein each inertial platform is stabilized by two, two degree-of-freedom gyros, so that one gyro on each platform has a redundant axis, and wherein each platform has a pair of pickoff devices arranged to indicate the respective attitude of said platform, and wherein the redundant axis gyro on each platform has means adapted to provide an output indicating the attitude error of its platform about its redundant axis, comprising means for aligning the redundant gyro axes along a pair of mutually-perpendicular inertial reference axes lying in the plane of the platform, so that one of the redundant axes gyros is adapted to sense platform attitude error of one platform about one of said pair of inertial reference axes and the other redundant axis gyro is adapted to sense platform attitude error of the other platform about the other inertial reference axis;

means coupled to the redundant axis output of each of said redundant axis gyros for producing a logical signal whenever the platform attitude error sensed by the gyro exceeds a prescribed level;

means coupled to the platform pickoff devices of each platform for producing logical signals whenever the difference in platform attitude between said platforms about each of said pair of inertial reference axes exceeds prescribed levels; and logic circuit means coupled to each of said logical signal producing means for comparing said logical signals to produce fault warning output signals representing the operating condition of each of said platforms.

6. A performance monitoring arrangement as claimed in claim 5, wherein said platform pickoff devices are the roll and pitch pickoffs of each of said platforms and the logical signal producing means coupled to said pickoffs comprise means for sensing the difference in output between the roll pickoffs of the platforms to produce a roll difference signal, means for sensing the difference in output between the pitch pickoffs of the platforms to produce a pitch difference signal, and means for resolving said roll and pitch difference signals into a first logic output signal representing the difference in attitude of said platforms about said one inertial axis and a second logic output signal representing the difference in platform attitudes about said other inertial axis.

7. A performance monitoring arrangement as claimed in claim 6, wherein said logical signal producing means coupled to each of the redundant axis gyro outputs comprises sensing means for producing a rate signal representing the rate of movement of the platform about the redundant axis of the gyro, means for comparing said rate signal with a computed rate signal representing the rate of the corresponding non-redundant axis gyro for that platform to produce a rate difference signal and means for integrating said rate difference signal to produce an attitude difference signal representing platform attitude error about one of said inertial axes.

8. A performance monitoring arrangement as claimed in claim 7, wherein said computed rate signal is the gyro torquing signal for said corresponding non-redundant axis gyro and includes earth rate, velocity and gyro drift components to convert the inertial axis rate signals to earth-fixed coordinate signals.

* * * * *